(12) United States Patent
Trachanas et al.

(10) Patent No.: US 11,250,556 B2
(45) Date of Patent: Feb. 15, 2022

(54) METHOD AND DEVICE FOR INSPECTING IMAGES ON PRINT PRODUCTS USING AN IMAGE INSPECTION ROBOT

(71) Applicant: Heidelberger Druckmaschinen AG, Heidelberg (DE)

(72) Inventors: Ilias Trachanas, Plankstadt (DE); Andreas Fehlner, Mannheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 283 days.

(21) Appl. No.: 16/418,218

(22) Filed: May 21, 2019

(65) Prior Publication Data

US 2019/0385293 A1 Dec. 19, 2019

(30) Foreign Application Priority Data

Jun. 13, 2018 (DE) .......................... 102018209415.2

(51) Int. Cl.
*G06K 9/00* (2006.01)
*G06T 7/00* (2017.01)
(Continued)

(52) U.S. Cl.
CPC .............. *G06T 7/001* (2013.01); *B25J 9/023* (2013.01); *B25J 19/023* (2013.01);
(Continued)

(58) Field of Classification Search
CPC .......... G06T 7/001; G06T 2207/30144; H04N 1/00246; G06F 3/1259; G06F 3/1208;
(Continued)

(56) References Cited

U.S. PATENT DOCUMENTS 8,965,583 B2 2/2015 Ortamaier et al.
2004/0177783 A1* 9/2004 Seymour ............. B41F 33/0036
101/484
(Continued)

FOREIGN PATENT DOCUMENTS

DE 102004061951 A1 7/2006
DE 102007055204 A1 5/2009
(Continued)

OTHER PUBLICATIONS

Nayef, Nibal et al.,"SmartDOC-QA: A Dataset for Quality Assessment of Smartphone Captured Document Images—Single and Multiple Distortions", CBDAR Workshops, 13th International Conference on Document Analysis and Recognition (ICDAR), pp. 1231-1235, 2015.*

(Continued)

*Primary Examiner* — Samir A Ahmed
(74) *Attorney, Agent, or Firm* — Laurence A. Greenberg; Werner H. Stemer; Ralph E. Locher

(57) ABSTRACT

A method for inspecting images on print products in a printing material processing machine includes recording and digitizing produced print products using at least one image sensor in an image inspection process of a print job using an image inspection system. The recorded digital prints that have been created are compared to a digital reference image by using a computer and, if deviations are found between the recorded digital prints and the digital reference image, print products found to be defective are removed. The image sensor records the produced print products from at least two different viewing angles and/or viewing distances and the computer evaluates the at least two recorded digital prints as a function of the at least two viewing angles and/or viewing distances and assesses them in terms of deviations. A device for inspecting images on print products is also provided.

2 Claims, 3 Drawing Sheets

(51) Int. Cl.
*H04N 1/00* (2006.01)
*G06F 3/12* (2006.01)
*B25J 19/02* (2006.01)
*G06K 15/10* (2006.01)
*B25J 9/02* (2006.01)
*G06K 9/03* (2006.01)

(52) U.S. Cl.
CPC .......... *G06F 3/1208* (2013.01); *G06F 3/1259* (2013.01); *G06K 15/102* (2013.01); *H04N 1/00246* (2013.01); *G06K 9/036* (2013.01); *G06T 2207/30144* (2013.01)

(58) Field of Classification Search
CPC ....... B25J 19/023; B25J 11/00; G06K 15/102; G06K 9/036; B41F 33/0036
See application file for complete search history.

(56) References Cited

U.S. PATENT DOCUMENTS

| | | | | |
|---|---|---|---|---|
| 2004/0201699 | A1* | 10/2004 | Parulski | H04N 1/6011 348/207.99 |
| 2006/0147092 | A1* | 7/2006 | Zhang | G06T 7/001 382/112 |
| 2007/0096414 | A1 | 5/2007 | Beaudoin | |
| 2010/0208980 | A1* | 8/2010 | Urban | G01N 21/9501 382/149 |
| 2011/0044510 | A1* | 2/2011 | Maeder | G06T 7/001 382/112 |
| 2013/0016208 | A1* | 1/2013 | Duss | B41F 1/28 348/92 |
| 2015/0130925 | A1 | 5/2015 | Park et al. | |
| 2015/0278987 | A1* | 10/2015 | Mihara | G06T 15/205 345/427 |
| 2017/0144464 | A1* | 5/2017 | Yamazaki | B41F 33/0036 |

FOREIGN PATENT DOCUMENTS

| | | |
|---|---|---|
| EP | 2128056 A1 | 12/2009 |
| EP | 2752638 A2 | 7/2014 |
| WO | 2018059663 A1 | 4/2018 |

OTHER PUBLICATIONS

Pál, Magdolna et al., "Image processing based quality control of coated paper folding", Measurement 100 (2017) 99-109.*

* cited by examiner

METHOD AND DEVICE FOR INSPECTING IMAGES ON PRINT PRODUCTS USING AN IMAGE INSPECTION ROBOT

CROSS-REFERENCE TO RELATED APPLICATION

This application claims the priority, under 35 U.S.C. § 119, of German Patent Application DE 10 2018 209 415.2, filed Jun. 13, 2018; the prior application is herewith incorporated by reference in its entirety.

BACKGROUND OF THE INVENTION

Field of the Invention

The present invention relates to a device and a method for inspecting images on print products in a printing machine by using a robot arm.

The technical field of the invention is the field of print quality control.

In today's printing industry and in particular in larger printing machines, quality control is carried out in an automated way by so-called in-line inspection systems, which will be referred to herein as image recording systems. In that case, "in-line" means that the image recording system or, to be more precise, the camera of the image recording system, is disposed in the printing machine. It is usually disposed downstream of the last printing unit or, if a further processing unit such as a varnishing unit is provided, downstream of the latter to record the print products that have been produced in the printing machine. The device may be a camera or a camera system including multiple cameras. The use of other image sensors is likewise possible. However, for reasons of simplicity, only the term "camera" will be used in the present document. An image processor then compares the digital printed images that have been created by using the camera in that way to corresponding good images of the image to be printed. Those good images may be created from pre-print data or taught in. In that case, teaching-in or training means that a number of print products bearing the image to be printed are printed and recorded by the camera of the image recording system. Those sample prints need to be as defect-free as possible. Once they have been recorded by the image recording system, they are therefore saved in the image processor as a digital reference. In the production run, the created print or parts thereof are recorded by the image recording system and compared to the reference image that has been digitally taught in or created from pre-print data. If that process finds deviations between the print products created in the production run and the digital reference, the operator is alerted to the deviations and may then decide whether the deviations are acceptable or whether the print products that have been created in that way are waste and need to be removed. The printed sheets that have been found to be waste may be removed by a waste removal switch. In that context it is of major importance to ensure both that the reference image is without defects and that the actual print that has been recorded by the image recording system actually corresponds to the actual printed image. Defects that are created as the image is recorded, for instance due to a lack of illumination, a contaminated lens of the camera, or other influences, must not have any negative influence on the inspection process.

However, such automated inspection systems cannot factor in different aspects of a human inspection of the created print product by the end customer. In that context, the decisive question is whether or not the quality of a printed product that has been created is acceptable to the end customer. On one hand, that depends on the type of the print job: a glossy brochure will certainly have to meet much higher quality requirements than a flyer. On the other hand, it depends on the individual expectations and ideas of the individual end customer, which may well differ from one another to a considerable extent. In order to check the quality of the created print product, the end customers take the printed product in their hands and inspect it from various angles and at different distances from the eye. Such personal quality expectations are difficult to reproduce by the automated inspection systems that are known in the art.

In digital printing, in particular inkjet printing, attempts to standardize print quality assessment, in particular for assessing white lines, have become known. Those attempts include using data from gray value analyses and assessment grades given by experts and non-specialists to create a model in an attempt to factor in individual quality requirements at least to some extent. However, that approach only makes sense for a specific assessment of white lines in inkjet printing. It is not capable of simulating a personal quality assessment, inspection and approval by an end customer who examines the created print products from different viewing angles and viewing distances and of factoring in different quality requirements in terms of the print job and background thereof.

Methods for factoring in distortions that occur in a recorded print due to a deviated viewing angle of the recording camera in a corresponding way are known in the art. However, they are intended to compensate for different viewing angles instead of making use of them specifically to simulate the aforementioned personal quality assessment by an end customer.

European Patent Application EP 27 52 638 A2, corresponding to U.S. Patent Application Publication US 2015/0130925, furthermore discloses a method and a device in which an inspection system uses different light sources that use different wavelengths and different viewing angles and viewing distances to illuminate an object to be inspected. Yet the camera or image sensor that is then used to inspect the object always has the same viewing angle and viewing distance. However, that document refers to illuminating the object to be inspected in an optimum and variable way to improve the quality of the inspection. That disclosure does not provide a way of implementing the aforementioned subjective quality assessment by an end customer.

SUMMARY OF THE INVENTION

It is accordingly an object of the invention to provide a method and a device for inspecting images on print products using an image inspection robot, which overcome the hereinafore-mentioned disadvantages of the heretofore-known methods and devices of this general type and which are capable of simulating a subjective inspection of the created print product by an end customer in the most realistic possible way.

With the foregoing and other objects in view there is provided, in accordance with the invention, a device for inspecting images on print products in a printing material processing machine, the device comprising a computer, a robot arm, and an image sensor fixed to the robot arm. The robot arm is constructed to be mobile and controllable by the computer in such a way that in the course of the image inspection process, the image sensor scans the print products produced in the printing material processing machine from various viewing angles and various viewing distances and the robot arm is equipped to provide viewing angles of between 0° and 180° between the image sensor and the print products. The robot arm is configured and constructed in such a way that it is capable of moving the image sensor that is fixed to it into several different positions above the produced print products to allow the image sensor to scan the produced print products from different viewing angles and viewing distances. In this context, it is possible to provide the robot arm inside the printing machine as part of an inline inspection system, usually downstream of the last printing unit, or outside the printing machine for an external inspection of images outside the printing machine. The actual construction of the robot arm, for instance including various joints, ball bearings, etc., is of minor importance in this context. The only important aspect is that it needs to be capable of assuming various viewing angles and viewing distances. Since, in an inline image inspection process, the created print products are conveyed underneath the image sensor at a very high speed, it is additionally possible for different viewing angles and viewing distances to be assumed not for every individual created print product but only for every x print products that have been produced, where x is a function of the speed of movement of the robot arm. In such a case, the image content on the created print products must not change. In an external image inspection process outside the printing machine, this aspect is irrelevant. Since created print products are to be inspected, i.e. two-dimensional representations, corresponding viewing angles of between 0 and 180° make sense and need to be within the range of movement of the robot arm. Of course, the end points of this range, i.e. 0° and 180°, are merely theoretical values because at such values, the image sensor scans in a horizontal direction, i.e. parallel to the actual print that has been created on the print product. The core of this statement is that a scanning of the image from extremely flat/acute angles is to be possible.

With the objects of the invention in view, there is also provided a method for inspecting images on print products in a machine for processing printing material by using a computer, the method comprising the steps of recording and digitizing the produced print products by using at least one image sensor in the course of an image inspection process of a print job by using an image inspection system, comparing the recorded digital prints that have been created in this way to a digital reference image by using the computer and, if deviations are found between the recorded digital prints and the digital reference image, removing the print products that have been found to be defective. The image sensor records the produced print products from at least two different viewing angles and/or viewing distances and the computer evaluates the at least two digital prints recorded in this way as a function of the at least two viewing angles and/or viewing distances and assesses them in terms of deviations. In order to provide the most accurate possible simulation of an end customer's personal assessment, it is necessary to record the image from at least two different viewing angles and viewing distances. In general, a recording from two different viewing angles includes a recording from two different distances, but this is not a prerequisite for the method of the invention. The digital prints that have accordingly been recorded in this way are then compared to the digital reference image to assess the quality of the print on the print product that has been created. For this purpose, the first step that is necessary is to evaluate the two digitized printed images that have been recorded from different viewing angles and/or distances to decide which one of the two printed images will be compared to the digital reference. Combining the two recorded digital printed images, for instance in the form of a superposition of the two printed images, is a possible alternative.

Advantageous and thus preferred further developments of the method will become apparent from the associated dependent claims and from the description together with the associated drawings.

Another preferred development of the method of the invention in this context is that the at least two different viewing angles are taken into consideration from 0 to 180° both vertically in terms of elevation and horizontally in terms of azimuth. An optimum simulation of an end customer's personal assessment ought to factor in the angles both in terms of horizontal angle, i.e. azimuth, and in terms of the vertical angle, i.e. elevation. In this way, an ideal three-dimensional inspection of the created print product is possible in a way similar to how a customer would assess the created print product.

A further preferred development of the method of the invention in this context is that to evaluate the at least two recorded digital printed images, the computer determines respective quality parameters that represent a function of elevation, azimuth, and distance, and assesses the at least two digital printed images on the basis of these quality parameters to find deviations. In order for the digital printed images that have been created in this way to be evaluated as a function of the viewing angle and distance, it is expedient to establish so-called quality parameters for every one of the digital printed images. These quality parameters may then be compared to one another to decide, based on this comparison, which of the generated digital printed images are to be compared to the digital reference image. In this context, the quality parameters are directly dependent on the two different viewing angles, elevation and azimuth, as well as on the viewing distance. They virtually result in a four-dimensional function with these three different function values.

An added preferred development of the method of the invention in this context is that the established quality parameters are assessed by using an assessment criterion that is dependent on the quality requirements of the print job. In order to find the digitally generated printed image that is to be compared to the digital reference image, it is necessary to compare the quality parameters that have been established for every digitally recorded printed image not only with one another, but also in terms of an assessment criterion. This assessment criterion defines which ones of the quality parameters that have been established in a corresponding way and thus which one of the digital printed images is evaluated for the comparison with the digital reference image.

An additional preferred development of the method of the invention in this context is that the use of the worst quality parameter, the best quality parameter, or a quality parameter defined by an operator is defined as the assessment criterion. Various criteria may be used as assessment criteria. The selection of one is dependent on the quality requirements of the print job. If the quality requirements are very high, for instance for a glossy brochure, it makes the most sense to use the worst one of the available quality parameters and thus the corresponding generated digital printed image to provide the strictest possible examination. If the quality requirements are rather low, for instance for a flyer, the best quality parameter is used because this means that the examination is less strict. Further criteria, for instance criteria that are defined by the operator, are also possible.

A concomitant preferred development of the method of the invention in this context is that the computer controls the robot arm with the image sensor in such a way that the robot arm moves back and forth during the image recording process to simulate a shaking motion of the printed product during the inspection. When end customers inspect the created print product, they frequently make what are referred to as shaking motions, moving the generated printed product back and forth by hand to be able to directly compare the quality of the created print product from various viewing angles and distances with one another. Such a behavior may be simulated in accordance with the invention by controlling the robot arm with the image sensor in such a way that the robot arm moves back and forth during the image recording process. The digital printed images that are created in this process may be inspected either directly or on the basis of their established quality parameters and in a way that is true to reality.

Other features which are considered as characteristic for the invention are set forth in the appended claims.

Although the invention is illustrated and described herein as embodied in a method and a device for inspecting images on print products using an Image Inspection robot, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. The invention as such as well as further developments of the invention that are advantageous in structural and/or functional terms will be described in more detail below with reference to the associated drawings and based on at least one preferred exemplary embodiment.

DETAILED DESCRIPTION OF THE INVENTION

Figure 1:
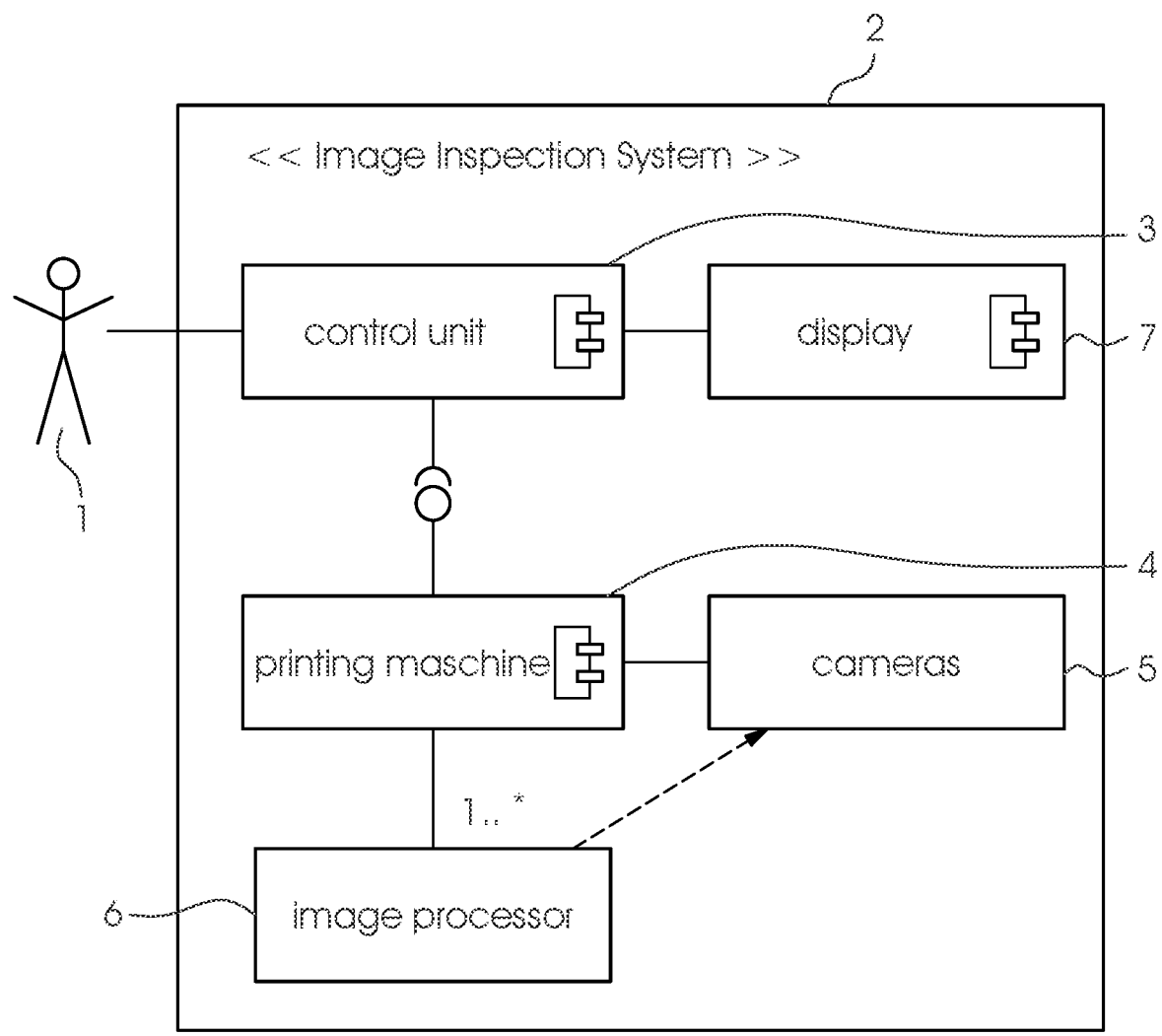
FIG. 1 is a block diagram illustrating an example of an image inspection system in a lithographic offset printing machine.

Referring now in detail to the figures of the drawings, in which mutually corresponding elements have the same reference symbols, and first, particularly, to FIG. 1 thereof, there is seen an example of an image recording system 2 implementing the method of the invention. The system is formed of at least one image sensor 5, usually a camera 5, which is integrated into a sheet-fed printing machine 4. The at least one camera 5 records the printed images generated by the printing machine 4 and transmits data to a computer 3, 6 for analysis. This computer 3, 6 may be a separate computer 6, e.g. one or more dedicated image processors 6, or it may be identical with the control unit 3 of the printing machine 4. At least the control unit 3 of the printing machine 4 has a display 7 for displaying the results of the image inspection process. In the preferred exemplary embodiment, a sheet-fed lithographic offset printing press 4 is used, although the method of the invention may just as well be used in an inkjet printing context.

Figure 2:
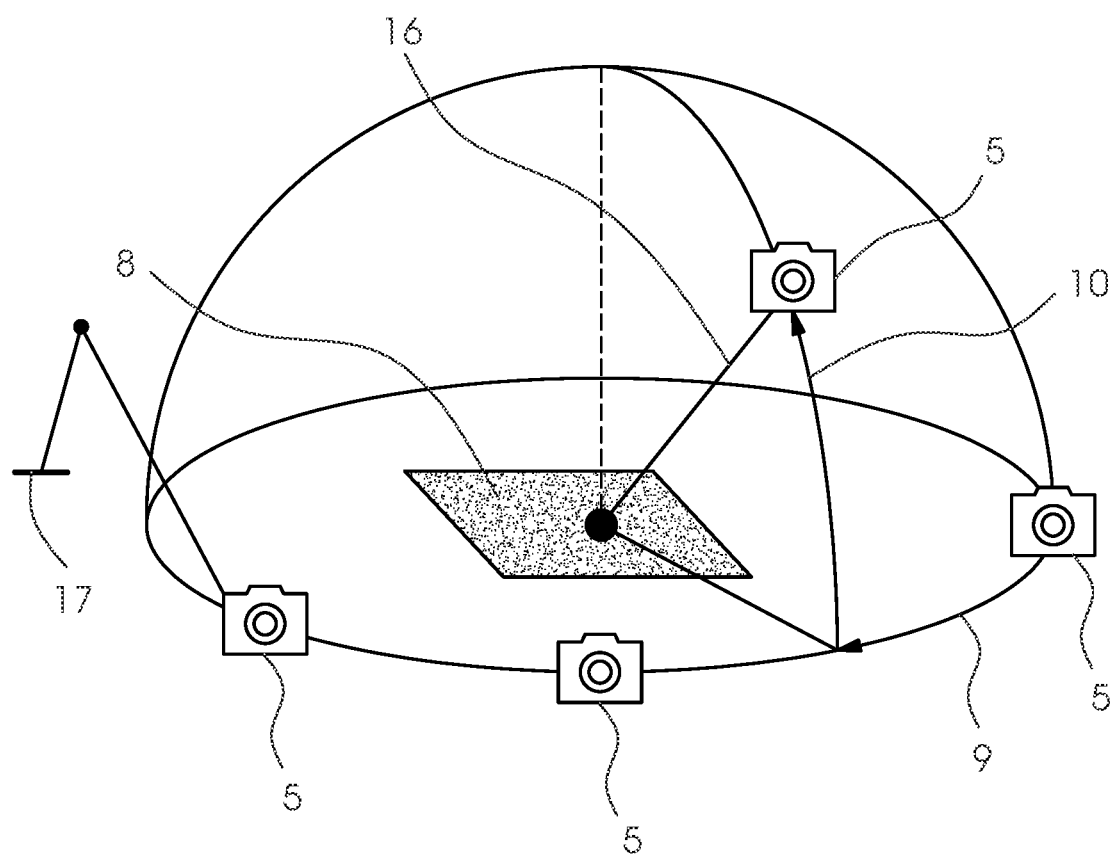
FIG. 2 is a diagrammatic, perspective view of configurations of an image sensor provided by the robot arm.

FIG. 2 diagrammatically shows a preferred embodiment of the device of the invention. One can clearly see how, due to a robot arm 17, which is controlled by the computer 3, the camera 5 is capable of assuming different positions above a print product 8 to be inspected, in the present case a printed sheet 8. The positions provide different viewing angles and viewing distances from which the sheet 8 to be inspected may be inspected. One can clearly see two viewing angles of elevation 10, i.e. a vertical angle, an and azimuth 9, i.e. a horizontal angle, as well as a distance d 16 between the camera 5 and the inspection sheet 8.

Figure 3:
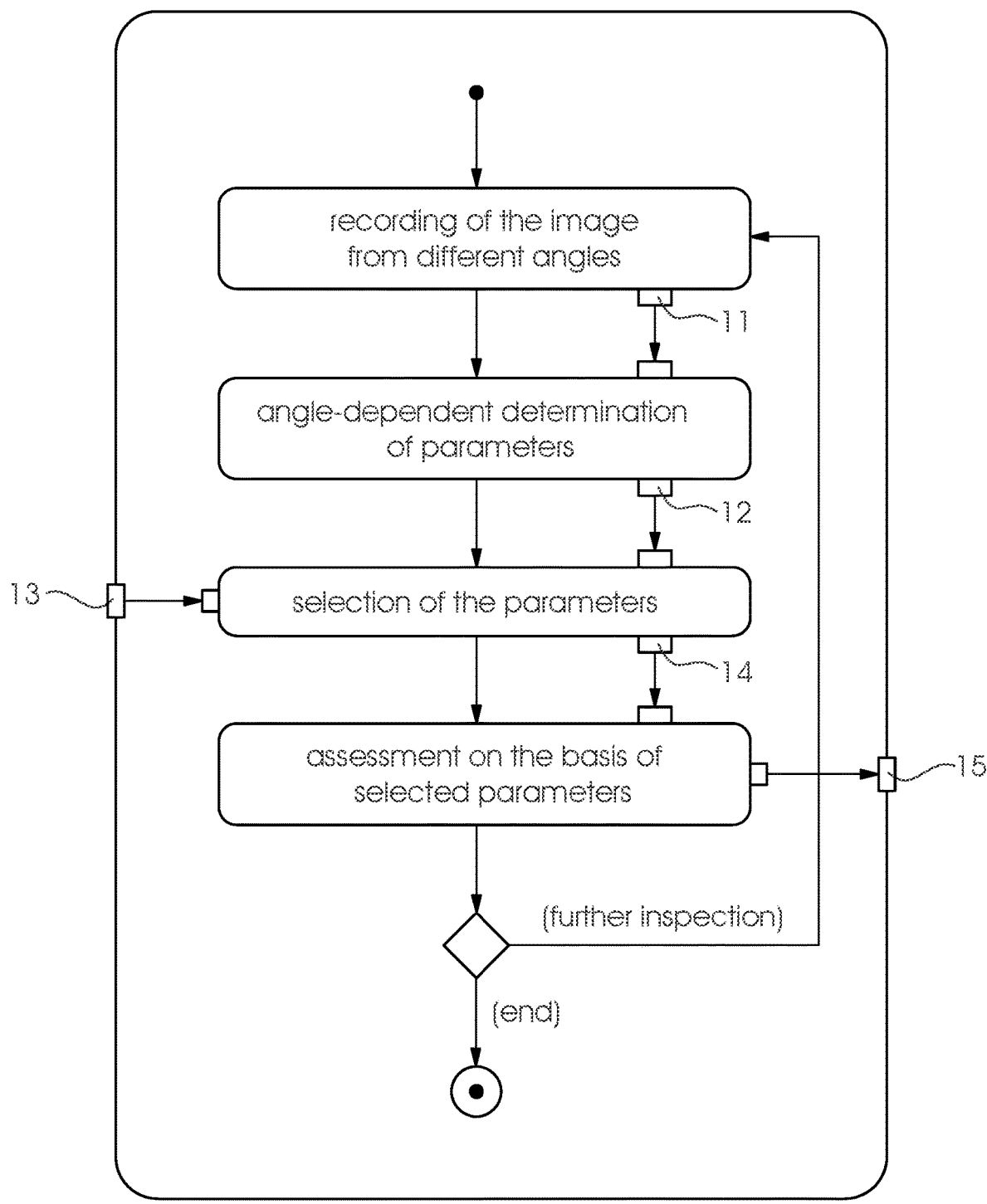
FIG. 3 is a flow chart of the method of the invention.

A flow chart of the method of the invention, which is implemented by the device of the invention shown in FIG. 2, is shown in FIG. 3. The first step of the method is to record and digitize the inspection sheet 8 with the printed images created thereon from different viewing angles in terms of the azimuth 9, elevation 10 between 0° and 180°, and from different viewing distances 16 by using the camera 5 and the device of the invention. An algorithm implemented on the computer by software derives quality parameters 12 from individual image data 11 as a function of the viewing angles 9, 10 and the viewing distance d 16. The parameters are a function of the viewing angles 9, 10 and the viewing distance 16: $K(\varphi, \theta, d)$. It may additionally be dependent on the quality requirements of the print job and on the personal characteristics of a potential inspector 1 in terms of age, sex, etc. The result is a typical end customer's personalized requirement for the image to be printed. For a final assessment of the inspection sheet 8, the value with the worst quality parameter 12 or with the best quality parameter 12 is selected as an assessment criterion 13 and compared to a typical parameter 12 defined by the operator as a basis for evaluation 14. If the method of the invention is used in a continuous monitoring process in the course of the image inspection during the printing operation, a threshold needs to be defined. When the threshold is exceeded, the printed sheets to be inspected are waste depending on a result 15 of the assessment.

In a further preferred embodiment, the camera 5 is moved back and forth or from side to side by the robot arm 17 to simulate what is practically a shaking motion, which is a common image inspection process among persons 1 skilled in the art.

The device of the invention and the method of the invention thus scan sample prints from various viewing angles 9, 10 and viewing distances 16. The subsequent automated print quality assessment is reproducible, promotes standardization, and saves time because it does not require an assessment by a skilled operator. In addition, the method of the invention provides a way of factoring in an end consumer's assessment.

The following is a summary list of reference numerals and the corresponding structure used in the above description of the invention:

1 operator
2 image recording system
3 control unit
4 printing machine
5 image sensor/camera
6 image processor
7 display
8 inspection sheet
9 azimuth
10 elevation 11 digitized prints recorded from different angles
12 established parameters
13 criterion for selection
14 selected parameters
15 assessment result
16 distance between camera and inspection sheet
17 robot arm

The invention claimed is:

1. A method for inspecting images on print products in a printing material processing machine, the method comprising the following steps:

using at least one image sensor to record and digitize produced print products in an image inspection process of a print job carried out by an image inspection system, the image sensor recording the produced print products from at least one of different viewing angles or different viewing distances;

using a computer to compare at least two created and recorded digital prints to a digital reference image, the computer evaluating the at least two recorded digital prints as a function of the at least one of different viewing angles or different viewing distances and the computer assessing the at least two recorded digital prints in terms of deviations;

using the computer to control a robot arm having the image sensor by moving the robot arm back and forth during an image recording process to simulate a shaking motion of the printed product during the inspection process; and removing defective print products upon finding deviations between the recorded digital prints and the digital reference image.

2. The method according to claim 1, which further comprises taking the at least two different viewing angles into consideration from 0 to 180° both vertically in terms of elevation and horizontally in terms of azimuth.

* * * * *